United States Patent
Debray (10) Patent No.: US 8,025,074 B2
(45) Date of Patent: Sep. 27, 2011

(54) MICRO-MACHINED TEMPERATURE DEPENDENT ONE-SHOT VALVE AND PROCESS FOR PRODUCTION THEREOF

(75) Inventor: Alexis Debray, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1136 days.

(21) Appl. No.: 11/937,790

(22) Filed: Nov. 9, 2007

(65) Prior Publication Data

US 2008/0173354 A1  Jul. 24, 2008

(30) Foreign Application Priority Data

Nov. 10, 2006  (JP) .................................. 2006-305353

(51) Int. Cl.
*F16K 17/38* (2006.01)
(52) U.S. Cl. .............................. 137/74; 251/11; 220/89.4
(58) Field of Classification Search .................... 137/72, 137/74; 251/11; 220/89.4
See application file for complete search history.

(56) References Cited

U.S. PATENT DOCUMENTS

| | | | | |
|---|---|---|---|---|
| 3,466,224 | A | * | 9/1969 | Vaughn .......................... 220/586 |
| 4,232,796 | A | * | 11/1980 | Hudson et al. ............... 220/89.4 |
| 4,240,573 | A | * | 12/1980 | Hudson, Jr. .................... 228/184 |
| 4,313,453 | A |   | 2/1982 | Holmes ............................ 137/74 |
| 5,154,201 | A | * | 10/1992 | Yanagihara et al. ............. 137/72 |
| 5,320,127 | A | * | 6/1994 | Yanagihara et al. ............. 137/72 |
| 5,526,385 | A |   | 6/1996 | Stockhausen et al. ......... 376/284 |
| 6,575,188 | B2 | * | 6/2003 | Parunak ........................... 251/11 |
| 6,949,385 | B1 | * | 9/2005 | Burns et al. ..................... 137/74 |

OTHER PUBLICATIONS

Oh, K. et al., "A review of microvalves", © 2006 IOP Publishing Ltd., J. Micromech. Microeng. 16 (2006), pp. R13-R39.
Guérin, L. J. et al., "Miniature One-Shot Valve", IEEE Mems Conference (1998), pp. 425-428.
Griss, P. et al., "Expandable microspheres for the handling of liquids", © The Royal Society of Chemistry 2002, Lab Chip, 2, pp. 117-120.
Santini, J. Jr., "Microchips as Controlled Drug-Delivery Devices", Angew. Chem. Int. Ed. 2000, 39, pp. 2396-2407.
Gracias, D. et al., "Forming Electrical Networks in Three Dimensions by Self-Assembly", Science, vol. 289, Aug. 18, 2000, pp. 1170-1172.
"Bismuths Alloys", Small Parts, Inc., viewed Mar. 10, 2008, <http://www.smallparts.com/products/descriptions/lma.cfm (3 sheets).
Zheng, W. et al., "Fabrication of Multicomponent Microsystems by Directed Three-Dimensional Self-Assembly", Adv. Funct. Mater. 2005, 15, No. 5, pp. 732-738.
Lorenz, H. et al., "SU-8: a low-cost negative resist for MEMS",© 1997 IOP Publishing Ltd., J. Micromech. Microeng., 7 (1997), pp. 121-124.

* cited by examiner

*Primary Examiner* — John Rivell
(74) *Attorney, Agent, or Firm* — Fitzpatrick, Cella, Harper & Scinto (57) ABSTRACT

A micro-machined temperature dependent one-shot valve is provided which has an operation temperature adjustable readily, causing no leakage below the operation temperature even at a high pressure difference, being useful both in a liquid environment and in a gas environment, and being miniaturizable. The micro-machined temperature dependent one-shot valve comprises a silicon substrate 100, a channel 101 penetrating the entire thickness of the silicon substrate, and a low melting point metal member 101 deposited on one face of the silicon substrate to obstruct the channel.

18 Claims, 4 Drawing Sheets

MICRO-MACHINED TEMPERATURE DEPENDENT ONE-SHOT VALVE AND PROCESS FOR PRODUCTION THEREOF

BACKGROUND OF THE INVENTION

1. Field of the Invention

The present invention relates to a micro-machined temperature dependent one-shot valve, and to a process for production thereof. More specifically the present invention relates to a temperature dependent one-shot valve having a rupture mechanism, useful as a safety mechanism of a fuel cell, a feed-starting mechanism of a lab-on-a-chips, and a smart micro-pill, or a like mechanism. The present invention relates also to a process for producing the valve by a micro-machine technologies.

2. Description of the Related Art

Since 1980s, various micro-valves are disclosed which are produced by micro-machine technologiess (hereinafter referred to as "micro-machined valves"); (K. W. Oh, and C. H. Ahn: "A review of microvalves", J. Micromech. Microeng., 16, R13-R39, 2006). According to the disclosures, the micro-machined valves are classified mainly into two groups: passive valves and active valves.

On the other hand, another type of micro-machined valves are known which are designed to function only once, such as one-shot valves. The one-shot valves are useful, for example, as a valve for triggering a mixing reaction in a lab-on-a-chips, and a valve for delivering a medical sample to a smart micro-pill. The one-shot valves, which are constructed as a thermally operated valve, are useful as a safety valve of a fuel cell of a small portable device having a small fuel tank. Such a valve can be applicable as a rupture mechanism for releasing the pressure when the pressure of the fuel cell rises abnormally owing to a temperature rise.

In the present invention, the one-shot valve which is manufactured by a micro-machine technologies and is operated by a temperature rise is defined as a micro-machined temperature dependent one-shot valve.

A micro-machined temperature dependent one-shot valve is disclosed by O. Guerin, L. J. O. Dubochet, J.-F. Zeberli, Ph. Clot, and Ph. Renaud: "Miniature one-shot valve" IEEE MEMS Conference, pp. 425-428, 1998. This one-shot valve opens a obstructed micro-channel by melting of a polyethylene layer. Therefore, the operation temperature of this valve depends on the melting temperature of the polyethylene.

Another micro-machined temperature dependent one-shot valve which utilizes a micro-sphere is disclosed by P. Griss, Anderson H., and G. Stemme: "Expandable Microspheres for the Handling of Liquids", *Lab Chip*, 2:pp. 117-120, 2002. In this micro-machined temperature dependent one-shot valve, a micro-sphere held in a channel expands at or above a preset temperature to a volume of about 60 times the original volume to obstruct the channel. This micro-machined temperature dependent one-shot valve serves to obstruct an release channel.

A still another micro-machined one-shot valve which is operated by an electric current is disclosed by J. T. Santini, A. C. Richards, R. Scheidt, M. J. Cima, and R. Langer: "Microchips as Controlled Drug-Delivery Devices", Angew. Chem. Int. Ed. 39, pp. 2396-2407, 2000. This valve is placed in a cell in a silicon wafer. At the top of the cell, a metal layer serving as an anode is deposited, and beside the cell another metal layer serving as a cathode is fusion bonded. This valve is immersed in an electrolyte solution. Application of a potential between the anode and the cathode oxidizes the anode and dissolves the anode in the electrolyte solution to open the valve.

Further, a thermal operation valve is disclosed in U.S. Pat. No. 4,313,453. This valve is constituted of a sealing member composed of a solder placed at a metal tube connection portion. This solder stops the flow in the tube. Application of heat melts the solder to open the valve to allow the liquid to flow through the metal tube.

A safety device which prevents a damage of an atomic reactor pressure vessel is disclosed in U.S. Pat. No. 5,526,385. This device has a solder sealing at a pressure-compensation opening. In the normal operation, the solder in a solid state seals the opening: an abnormally high temperature melts the solder and the overpressure inside the reactor pushes out the melted solder to release the pressure.

The above-mentioned disclosed valves have disadvantages as below.

The one disclosed by O. Guerin et al. has its operation temperature not adjustable for its use, although the operation temperature of the micro-machined temperature dependent one-shot valve is preferably adjustable arbitrarily to be suitable for the use. The desired operation temperature of the valve depends on the boiling point of the liquid to be handled, the maximum pressure of the gas in the container, and so forth.

For a pressure release, the stop valve should be capable of opening a flow path. However, the one disclosed by P. Griss et al. serves only to obstruct the flow path, but cannot release the flow path.

The one disclosed by J. T. Santini et al. is useful only in an electrolyte environment, although the valve is preferably useful in any use environment as a safety mechanism or a feed-starting mechanism.

The micro-machined temperature dependent one-shot shot valve can be incorporated in a small system. Further it has advantages below. One advantage is a high responsiveness to the environmental temperature owing to rapid temperature diffusion in its small size of the valve. Another advantage is that the plural devices can be produced in a batch process on one and the same supporting member by a micro-machine technologies, especially an MEMS technique. This enables reduction of the production cost, and enables also simultaneous preparation of a control mechanism like a heater near the valve.

However, the one disclosed in U.S. Pat. Nos. 4,313,453 and 5,526,385 employing a solder is produced necessarily by a typical macro-technique. Therefore the device cannot be made smaller in the size than 2-3 mm$^3$, and the device cannot be produced by a batch process. Further, the control system like a heater cannot be incorporated directly.

The problems with the micro-machined temperature dependent one-shot valve are summarized as below.

At the ambient temperature higher than the preset temperature Tm, the pressure of the pressurized gas or liquid should be released. That is, the valve is designed such that the valve connected to a tank containing a pressurized gas or liquid is kept obstructed below the preset temperature, and opens at a temperature higher than the preset temperature. The temperature Tm of the valve opening should be made readily adjustable in design of the system. The valve should keep obstructing against a large pressure difference at a temperature below Tm in a designed range without leakage.

The valve is useful both in a liquid environment and in a gas environment. Further, the valve is preferably formed in a size typically smaller than 2-3 mm$^3$. The valve is preferably produced by a batch process. The valve can preferably be combined with a heater in the system for on-demand triggering of the valve.

LITERATURE LIST

1. D. H. Gracias, J. Tien, T. L. Breen, C. Hsu, and G. M. Whitesides: "Forming Electrical Network in Three Dimensions by Self-Assembly", Science, 289, pp. 1170-1172, 2000
2. "Material Safety Data Sheet of Indalloy Metal Mix Containing Bismuth", Indium Corporation of America-Europe-Asia-Pacific
3. "Bismuth Alloys", Small Parts Inc., http://www.smallparts.comm/products/descriptions/lma.cf m, 2006
4. W. Zheng, and H. O. Jacobs: "Fabrication of Multicomponent Microsystems by Directed Three Dimensional Self-Assembly", Advanced Functional Materials, 15, pp. 732-738, 2005
5. H. Lorenz, M. Despont, N. Fahrni, N. LaBianca, P. Renau, and P. Vettiger, "Su-8, a Low-Cost Negative Photo-Resist for MEMS", J. Micromech. Microeng., 7, pp. 121-124, 1997

SUMMARY OF THE INVENTION

The present invention intends to provide a micro-machined temperature dependent one-shot valve having an operation temperature adjustable readily, causing no leakage below the operation temperature even at a high pressure difference, being useful both in a liquid environment and in a gas environment, and being miniaturizable. The present invention intends also to provide a process for producing the above micro-machined temperature dependent one-shot valve which may contain a heater in a batch production process.

The present invention is directed to a micro-machined temperature dependent one-shot valve, comprising a silicon substrate, a channel penetrating the entire thickness of the silicon substrate, a low melting point metal member deposited on one face of the silicon substrate to obstruct the channel.

In the micro-machined temperature dependent one-shot valve, a metal layer can be provided between the low melting point metal member and the silicon substrate. The metal layer can be formed from copper. An adhesion layer can be provided between the metal layer and the silicon substrate. The adhesion layer can be a chromium layer or a titanium layer.

In the micro-machined temperature dependent one-shot valve, an adhesion layer can be provided between the metal layer and the silicon substrate. The can be a chromium layer or a titanium layer.

The low melting point metal member can be formed from an alloy containing at least one element selected from the group of Bi, Sn, Pb, In, and Cd.

In the micro-machined temperature dependent one-shot valve, a part of the low melting point metal member can be allowed to intrude into the channel.

The metal layer composed of copper can be covered by a photoresist layer, and a part of the low melting point metal member is allowed to intrude into the photoresist and is deposited to the metal layer composed of copper.

In the micro-machined temperature dependent one-shot valve, a trench can be formed on the portion of the silicon substrate onto which the low melting point metal member is deposited.

The surface of the low melting point metal member and the surface of the silicon substrate onto which the low melting point metal member is deposited can be covered at least partly by a photoresist.

In the micro-machined temperature dependent one-shot valve, a heater component can be placed between the low melting point metal member and the silicon substrate.

The present invention is directed to a process for producing a micro-machined temperature dependent one-shot valve comprised of a channel perforated through the entire thickness of a silicon substrate, and a low melting point metal member deposited on one face of the silicon substrate to obstruct the channel, comprising the steps of: forming a channel through the entire thickness of the silicon substrate, and depositing the low melting point metal member on a face of the silicon substrate to obstruct the channel.

The step of forming the channel can be conducted by reactive ion etching.

The step of forming the channel can be conducted by wet etching.

The patterning of the metal layer can comprise photolithography and metal etching. The pattern formed by the patterning can have a circular shape.

The process for producing a micro-machined temperature dependent one-shot valve can comprise the steps of: depositing the low melting point metal member, forcing a part of the low melting point metal member to intrude into the channel by heating the silicon substrate up to a temperature higher than the melting temperature of the low-melting metal and applying a pressure difference between the both ends of the channel.

The process for producing a micro-machined temperature dependent one-shot valve can comprise the steps of: forming a trench on one face of the silicon substrate, forming a channel to be adjacent to the trench perforated through the entire thickness of the silicon substrate, and depositing the low melting point metal member to cover the trench on the silicon substrate and to obstruct the channel.

The process for producing a micro-machined temperature dependent one-shot valve can comprise the steps of: forming a metal layer on one face of the silicon substrate, patterning the metal layer for formation of the low melting point metal member and for formation of a heater component simultaneously, forming channel perforated through the entire thickness of the silicon substrate at the position where the metal layer has been patterned for depositing of the low melting point metal member, and depositing the low melting point metal member on the patterned metal layer to obstruct the channel.

The present invention provides a micro-machined temperature dependent one-shot valve which has an operation temperature adjustable readily, causing no leakage below the operation temperature even at a high pressure difference, being useful both in liquid environment and in gas environment, and being miniaturizable. The present invention provides also a process for producing the above micro-machined temperature dependent one-shot valve which may contain a heater in a batch production process.

Further features of the present invention will become apparent from the following description of exemplary embodiments with reference to the attached drawings.

BRIEF DESCRIPTION OF THE DRAWINGS

FIGS. 5A and 5B are drawings illustrate schematically the micro-machined temperature dependent one-shot valve of Fifth Embodiment of the present invention, and the process for production thereof.

FIGS. 6A and 6B illustrate states of the actual micro-machined temperature dependent one-shot valves.

DESCRIPTION OF THE EMBODIMENTS

In the embodiments of the present invention, the micro-machined temperature dependent one-shot valve has a channel penetrating a silicon substrate through the entire thickness, and a low melting point metal member deposited onto one face of the silicon substrate to obstruct the channel.

The low melting point metal member changes its physical state (solid or liquid) depending on the temperature to change the mechanical strength against the pressure applied from the channel side. The low melting point metal member in a solid state obstructs the channel. The low melting point metal member, when it becomes liquid, is destructed to release the channel.

The melting temperature of the low melting point metal member can be adjusted arbitrarily by selecting the metal composition. Specifically, the valve operation temperature can be adjusted precisely at intervals of 2-3° C. in the range from 47° C. to several hundred degrees centigrade.

The pressure tolerance of the valve below the preset operation temperature can be improved in any of the several methods below.

In one method, an adhesion layer and a metal layer are provided between the low melting point metal member and the silicon substrate surface. In another method, the depositing area is increased by forming a trench on the silicon substrate surface.

In still another method, the low melting point metal member is allowed to intrude into the channel formed through the silicon substrate to increase the depositing strength. In still another method, the silicon substrate and the low melting point metal member depositing thereon are partly covered with a photoresist to improve the bonding strength of the low melting point metal member to withstand the inside pressure.

The micro-machined temperature dependent one-shot valve of the above constitution can be positively operated by a heater attached to the valve, not only by change of the ambient temperature.

The one-shot valve of the above constitution is useful as a release mechanism for a gas or a liquid.

According to the process for production of the present invention, the micro-machined temperature dependent one-shot valve can be produced in a size typically of smaller than 2-3 mm³. The smaller size of temperature dependent one-shot valve is highly sensitive to the ambient temperature as mentioned above to enable precise fine-tuning of the operation temperature. The valve can be produced in a batch process, which enables reduction of the production cost, and enables also simplification of installation of the heater by simultaneous fabrication.

The present invention is described below specifically by reference to drawings.

First Embodiment

The micro-machined temperature dependent one-shot valve and a production thereof of the present invention are described below.

Figure 1:
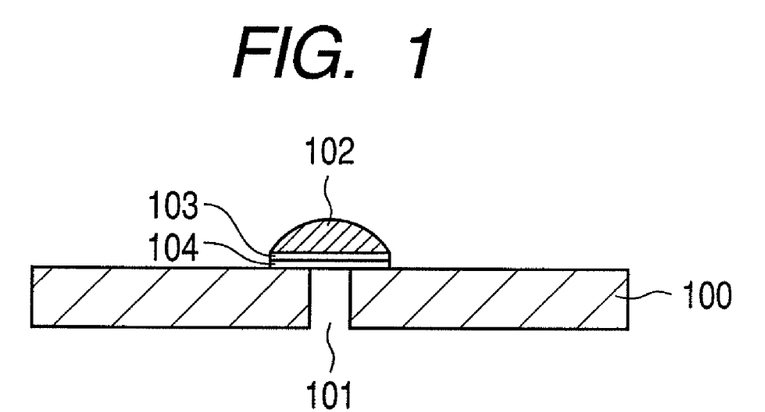
FIG. 1 is a schematic sectional view for describing the micro-machined temperature dependent one-shot valve of First Embodiment of the present invention, and the process for production thereof.

FIG. 1 is a sectional view for describing the micro-machined temperature dependent one-shot valve and the process for production thereof. The micro-machined temperature dependent one-shot valve of this Embodiment is constituted of channel 101 penetrating through silicon substrate 100, and metal member 102 deposited to obstruct the one end of channel 101.

A process for producing the micro-machined temperature dependent one-shot valve is described below.

Firstly, a mask for deep RIE (reactive ion etching) for forming the channel is formed on the back face of silicon substrate 100. When plural valves for the channels are produced in a batch process, the mask is formed to fit to the prescribed positions of individual channels 101. The mask is preferably solvent-resistant, and may be formed from aluminum, silicon dioxide, or a like material.

On the front face reverse to the masked face of silicon substrate 100, adhesion layer 104 is formed from chromium, and metal layer 103 is formed from copper (hereinafter referred to as "a copper layer"). The layers are patterned. The layers may be formed by sputtering not to form a pinhole. The patterning may be conducted either by photolithography and metal etching, or by a lift-off process. This pattern is formed also to fit to the prescribed positions of the individual valves to be formed on one substrate.

With the mask which has been formed preliminarily on the back face of substrate 100, silicon substrate 100 is etched by deep RIE to perforate channels 101 through silicon substrate 100. In this etching, metal layer 103 and adhesion layer 104 are not etched so that channel 101 is kept obstructed at the front side end.

Next, silicon substrate 100 is immersed in a two-phase liquid bath containing a fused low-melting metal as the lower phase and a dilute hydrochloric acid solution of pH 1 as the upper phase. This method is described in detail in Literature-1 shown later in the literature list. Incidentally, Literature 2-4 cited in the description below are also contained in the literature list. At first, natural copper oxide on the copper layer surface is etched by the dilute hydrochloric acid, whereas the oxide layer on the surface of the aluminum layer is not etched by the dilute hydrochloric acid. Since the interfacial energy between the water and the copper is higher than that between the low-melting metal and the copper, the copper layer is coated with the low-melting metal. On the other hand, the interface energy between water and other substance (aluminum oxide, silicon dioxide, and silicon) is lower than that between the low-melting metal and the above-mentioned substance. Therefore, the substance is not coated with the low-melting metal, but low melting point metal member 102 deposits selectively by depositing on metal layer 103 as shown in FIG. 1.

Finally, plural valves prepared on one substrate are separated by cutting in a prescribed size. In use of this valve, the positive pressure is applied from inside channel 101 against the valve, namely low melting point metal member 102.

The melting temperature of the low-melting metal employed preferably in the present invention is described briefly below. The melting temperature depends on the composition of the material of the low-melting metal. The data below are cited from Literature-2 and Literature-3.

A low-melting metal composed of Bi (44.7%), Pb (22.6%), Sn (8.3%), Cd (5.3%), and In (19.1%) has the melting temperature at 47° C. This is an example of an extremely low melting temperature. A change of the composition of the above low-melting metal to Bi (44.7%), Pb (22.6%), Sn (11.3%), Cd (5.3%), and In (16.1%) raises the melting temperature to 52° C. Thus a slight change of the composition changes the melting temperature of the low-melting metal slightly.

A higher melting temperature can be obtained by adjusting the composition of the metal. For example, a metal composed of Bi (33.33%), Sn (33.33%) and Pb (33.34%) has the melting point at 143° C. On the other hand, a metal composed of Bi (60%) and Cd (40%) has the melting point at 144° C.

Metals following the RoHS direction (lead-free and cadmium-free) are also applicable as the low-melting metal. For example, a metal composed of Bi (32.5%), Sn (16.5%), and In (51%) has the melting point at 60° C. A metal composed of Bi (5%), and In (95%) has the melting point at 150° C. Metallic Bi (100%) has the melting point at 271° C. Thus within the scope of the RoHS direction, a broad range of melting temperatures can be obtained.

When the melting temperature of the low-melting metal is higher than the boiling temperature (100° C.) of water, the water in the two-phase liquid bath is replaced by ethylene glycol (boiling point: 19° C.) or tetraethylene glycol (boiling point: 328° C.), (Literature-4).

Depending on the situation, instead of the deep RIE, channel 101 may be formed by wet etching by use of KOH or TMAH, a conventional silicon-etching solution. With KOH, the mask on the back face of substrate 100 may be formed from silicon nitride, and With TMAH, the mask may be formed from silicon dioxide. During the etching from the back face, the front face of substrate 100 is protected by a usual protection method like coverage with Teflon®.

Silicon can be etched at a much lower cost by wet etching than that by deep RIE. However, the pattern formed by the wet etching is usually rectangular in the shape and is aligned on the crystal face of the silicon substrate. In the rectangular pattern, mechanical stress concentrates at the right angles of the rectangular pattern disadvantageously. The mechanical stress accumulated during formation of metal layer 103 can break metal layer 103 in coating with the low-melting metal.

The deep RIE, on the other hand, can form any shape of pattern. A circular pattern formed thereby is less liable to cause breakage of metal layer 103.

When the low-melting metal is allowed to intrude into channel 101, the low-melting metal can not readily intrude the right angle of channel 101 having a rectangular cross-section. In this case also, the deep RIE with a circular pattern is preferred.

In some uses, the adhesion force of low melting point metal member 102 to silicon substrate 100 can be insufficient to cause separation of low melting point metal member 102 from silicon substrate 100 below the melting temperature of the low-melting metal to open the valve. The adhesion force of low melting point metal member 102 to silicon substrate 100 can be increased as described below. The low-melting metal is heated up to a temperature higher than its melting temperature, and in this state a controlled pressure is applied against the low-melting metal 102 toward the channel 101 to allow a part of the melted low-melting metal to intrude into channel 101. Then the low-melting metal in a melted state is cooled with the pressure difference kept retained. Thereby the low-melting metal becomes solidified at that position. The intrusion of a part of the low-melting metal into channel 101 increases the contact area between silicon substrate 100 and low melting point metal member 102. Moreover, the interface of the increased area of contact is directed to be parallel to the force applied to the low-melting metal in usual operation conditions. The strength of bonding of the low-melting metal with silicon substrate 100 at the channel wall against the shear force is higher than that perpendicular at the outside face of silicon substrate 100. The pressure for intrusion of a part of the low-melting metal into channel 101 may be applied either by a liquid or by a gas, and can readily be controlled by a pressure regulator. The pressure may be applied in the batch process to plural valves formed on a substrate, and the valves may be separated into individual valves.

Figure 6A:
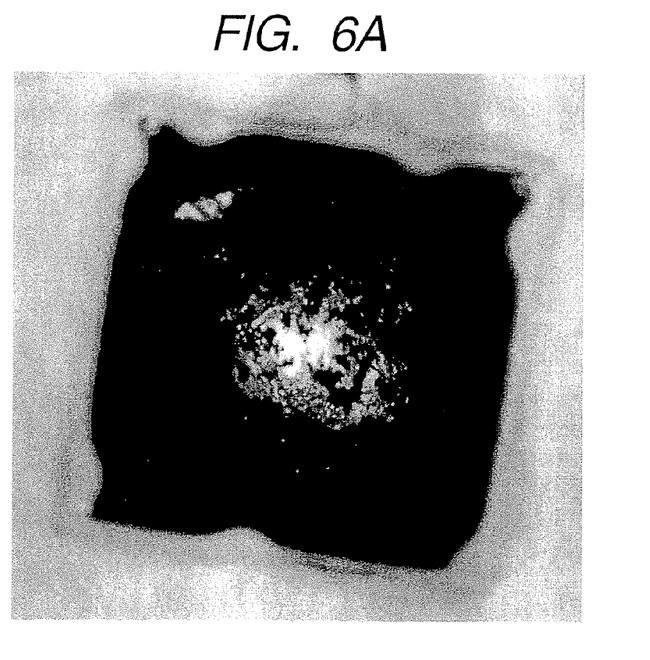
FIG. 6A is a top view of a valve in a obstructing state at a temperature below the valve operation temperature.
Figure 6B:
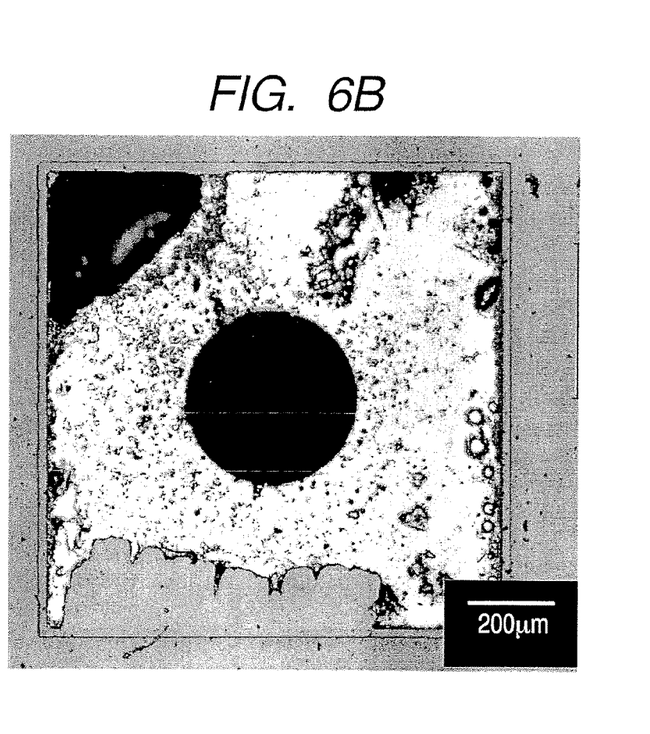
FIG. 6B is a top view of the valve opened by elevation of the ambient temperature and application of a pressure difference.

FIGS. 6A and 6B illustrate actually prepared micro-machined temperature dependent one-shot valves of the present invention. FIG. 6A is a top view of a valve in a obstructing state below the temperature of the valve operation. In FIG. 6A, the nearly square black-color portion indicates the low melting point metal member. FIG. 6B illustrates an opened valve which has been opened by elevating the ambient temperature and applying a pressure difference: the low melting point metal member is removed and the channel (the black circular portion at the center) is released. In the example of FIGS. 6A and 6B, the low-melting metal had a melting point of 47° C., and a pressure difference of 2.5 atmospheres was applied. This valve came to open at about 49° C.

Second Embodiment

Figure 2:
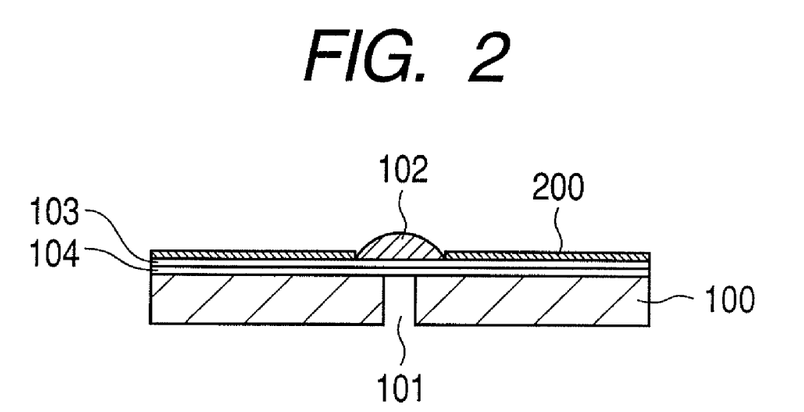
FIG. 2 is a schematic sectional view for describing the micro-machined temperature dependent one-shot valve of Second Embodiment of the present invention, and the process for production thereof.

In another type of micro-machined temperature dependent one-shot valve and a process of production thereof are described in this Embodiment. FIG. 2 is a sectional view for describing the micro-machined temperature dependent one-shot valve and the process for production thereof. In FIG. 2, the same symbols as in FIG. 1 are used for denoting the corresponding members.

This Embodiment is different from First Embodiment in that, in the process of coating with the low-melting metal, only the uncovered copper surface portion is coated with the low-melting metal by immersion in the two-phase liquid bath containing the melted low-melting metal.

In this Embodiment, as illustrated in FIG. 2, adhesion layer 104 formed from chromium and metal layer 103 formed from copper are not patterned, which is different from First Embodiment. The upper layer of copper is covered with photoresist layer 200. The photoresist is patterned by photolithography to bare only the portion of the copper surface to be coated with the low-melting metal. By immersion of substrate 100 in the liquid bath containing the melted low-melting metal, the bared portion only of the copper surface is coated with the low-melting metal. The surface of photoresist layer 200 will not be coated by the low-melting metal similarly as aluminum oxide, silicon, and silicon dioxide.

The production process of this Embodiment is simpler than that of Embodiment 1, since metal layer 103 is not patterned. Therefore, in the process of the present invention, the metal etching or photoresist peeling like a lift-off treatment is not necessary at all. Further, the larger area of metal layer 103 can prevent leakage through the boundary between chromium adhesion layer 104 and the upper face of silicon substrate 100. In particular, for use of a gas of a small mass like hydrogen in the system such as a fuel cell, the prevention of the gas leakage is important.

This Embodiment is preferred when the valve use environment is not limited by the heat-resistance, chemical stability, mechanical properties, and other properties of the photoresist.

Third Embodiment

Figure 3:
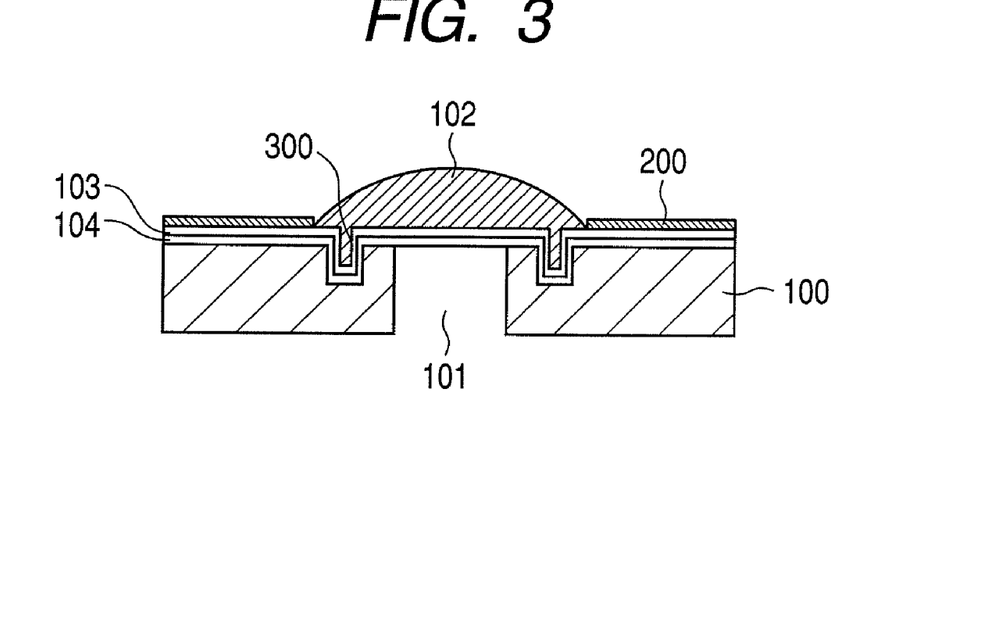
FIG. 3 is a schematic sectional view for describing the micro-machined temperature dependent one-shot valve of Third Embodiment of the present invention, and the process for production thereof.

The micro-machined temperature dependent one-shot valve in this Embodiment has a trench for stronger adhesion of the low melting point metal member to the substrate and for improved sealing of the valve. FIG. 3 is a sectional view for describing the micro-machined temperature dependent one-shot valve and the process for production thereof. In FIG. 3, the same symbols as in FIG. 1 are used for denoting the corresponding members.

This Embodiment intends to improve the adhesion of low melting point metal member 102 to silicon substrate 100, and to improve the sealing of the valve. For the above purposes, before formation of the chromium layer and the copper layer, trench 300 is provided on the surface of silicon substrate 100. This trench 300 can be formed by a conventional technique including masking, photolithography, and silicon etching. The other production steps basically are the same as in First Embodiment and Second Embodiment. When the wall face of trench 300 is nearly perpendicular to substrate 100 and the chromium layer and the copper layer are vapor-deposited by sputtering, the perpendicular wall face of trench 300 is coated with the metal layers. Therefore, in the process of the low-melting metal coating, low melting point metal member 102 intrudes into trench 300.

FIG. 3 illustrates trench 300 formed in the valve of Second Embodiment of the present invention. Trench 300 may be formed also in the valve of First Embodiment of the present invention.

The formation of trench 300 increases the contact area between low melting point metal member 102 and metal layer 103. This increase of the contact area strengthens the adhesion between low melting point metal member 102 and silicon substrate 100.

When the wall of trench 300 is formed nearly perpendicular to silicon substrate 100, the pressure difference at valve 102 causes a shearing force between low melting point metal member 102 and the wall of the trench 300. This partial intrusion of the low-melting metal into trench 300 strengthens the adhesion between low melting point metal member 102 and silicon substrate 100, similarly as in First Embodiment in which the low-melting metal is allowed to intrude into the channel.

Further, the sealing of the valve can be improved by selecting the shape of trench 300. Trench 300 surrounds channel 101 and is obstructed. The path for leakage of the fluid from channel 101 through trench 300 to the side of the valve is twisted, whereby the sealing is improved. Incidentally, the number of trenches 300 is not limited to that illustrated in FIG. 3. For further improvement of the bonding strength of low melting point metal member 102, the multiple trenches may be formed on the substrate surface.

Fourth Embodiment

The micro-machined temperature dependent one-shot valve of this Fourth Embodiment has a photoresist applied and patterned to improve the adhesion between low melting point metal member and the silicon substrate.

Figure 4:
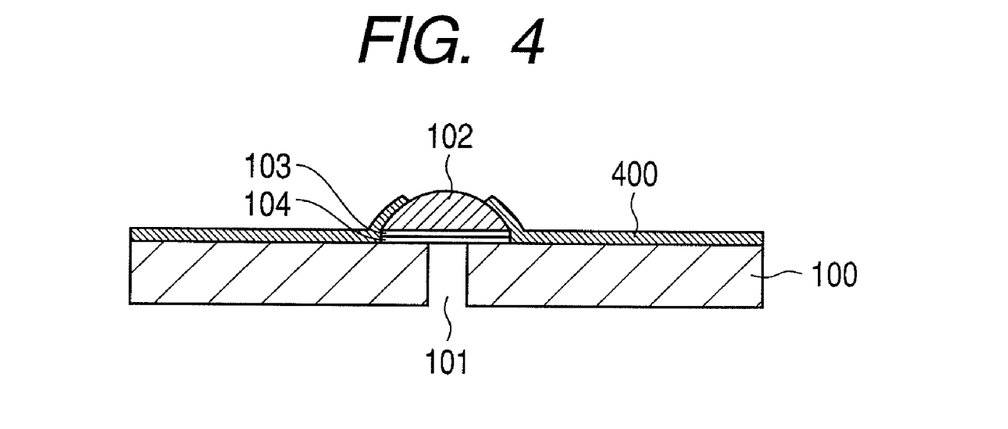
FIG. 4 is a schematic sectional view for describing the micro-machined temperature dependent one-shot valve of Fourth Embodiment of the present invention, and the process for production thereof.

FIG. 4 is a sectional view for describing the micro-machined temperature dependent one-shot valve and the process for production thereof. In FIG. 4, the same symbols as in FIG. 1 are used for denoting the corresponding members.

This Embodiment intends to improve not only the sealing of the valve but also to improve adhesion of low melting point metal member 102. The two improvements can be achieved by a simple formation step. After the production process described in any of the above Embodiments, photoresist layer 400 is formed on the face of the valve, and patterned by photolithography.

FIG. 4 illustrates application of the photoresist layer to First Embodiment. Photoresist layer 400 is patterned to cover the surface of the valve except the center portion of low melting point metal member 102. The opening portion may be in the shape of a disk, or may be in any other shape.

The contact area of between photoresist layer 400 and silicon substrate 100 is larger than that between low melting point metal member 102 and silicon substrate 100. Therefore, the adhesion force of photoresist 400 to silicon substrate 100 is stronger than the adhesion force between low melting point metal member 102 and silicon substrate 100. Further, photoresist 400 covers a part of low melting point metal member 102. This contributes to the increase of the adhesion force between low melting point metal member 102 and silicon substrate 100.

The path of possible leakage along the interface between silicon substrate 100 and chromium adhesion layer 104 is made longer by photoresist layer 400. This elongation of the leakage path improves the sealing.

The material of photoresist 400 of this Embodiment may be selected to be suitable for intended use of the valve. For example, Su-8, a photosensitive material for an epoxy-based, is suitable as a material for photoresist layer 400 since Su-8 is resistant against various solvents and acids (Literature-5). Otherwise a solvent-resistant photoresist like a OMR photoresist is useful.

Fifth Embodiment

The micro-machined temperature dependent one-shot valve of this Embodiment has a micro-heater inside the valve for on-demand triggering of opening the one-shot valve.

Figure 5A:
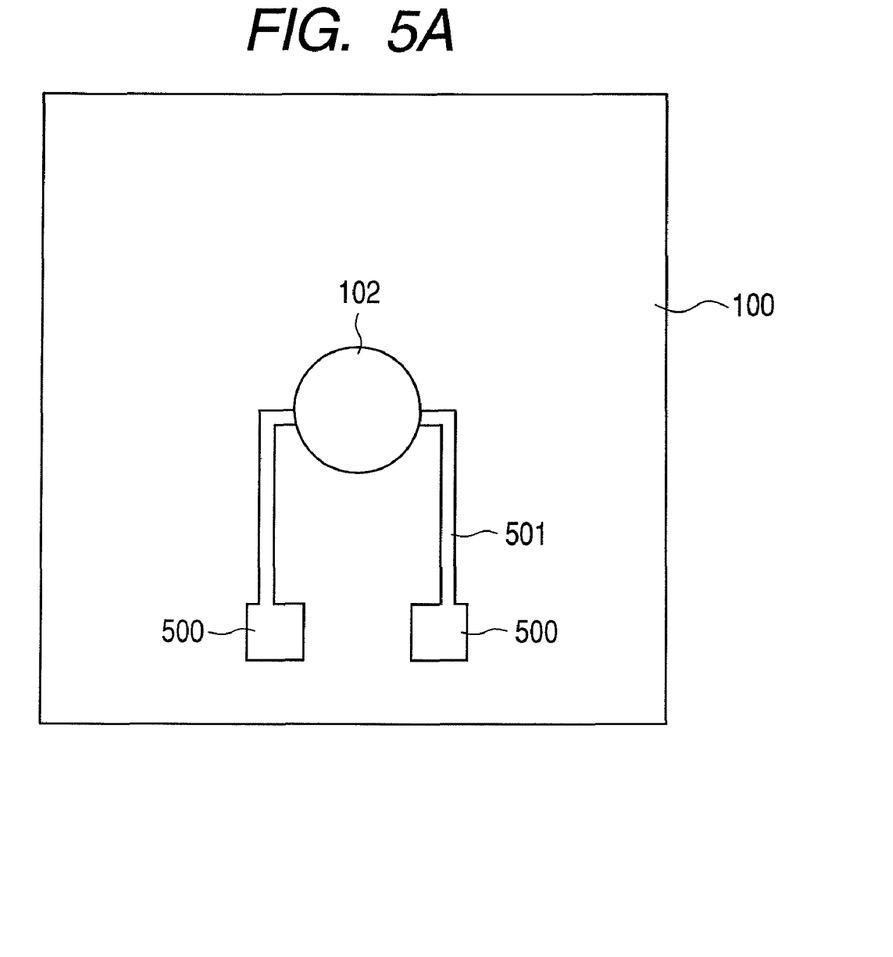
FIG. 5A is a schematic plan view.
Figure 5B:
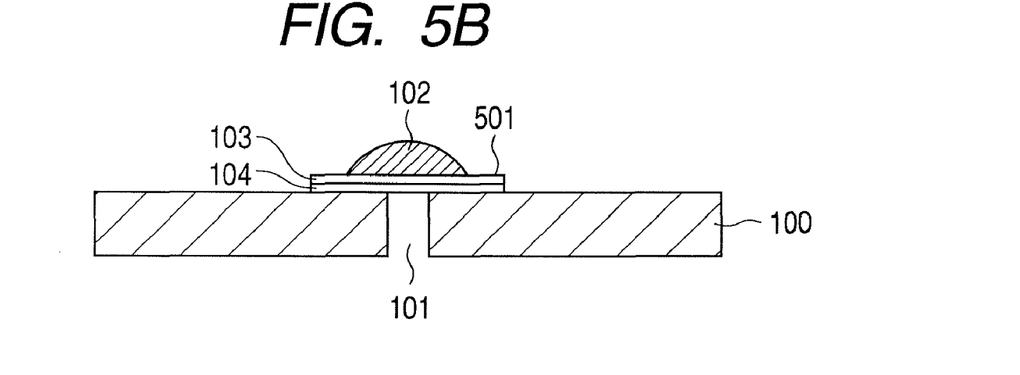
FIG. 5B is a schematic sectional view.

FIG. 5A is a schematic plan view of the micro-machined temperature dependent one-shot valve of this Embodiment. FIG. 5B is a schematic sectional view for describing the production process of the valve. In FIGS. 5A and 5B, the same symbols as in FIG. 1 are used for denoting the corresponding members.

In this Embodiment, a micro-heater is incorporated in the valve. The micro-heater is constituted of micro-resistor 501 placed between low melting point metal member 102 and substrate 100, and two electrode pads 500 connected electrically to micro-resistor 501. Micro-heater 501 placed under low melting point metal member 102 serves also substantially as metal layer 103. Application of an electric current from electrode pads 500 through micro-resistor 501 raises the temperature of the micro-heater to heat low melting point metal member 102. When the low-melting metal has been heated to a melting temperature of the low-melting metal, the valve is opened by the pressure difference between the both sides of the valve. Thus the valve can be opened as necessary by application of the electric current. The valve operated by application of an electric current to the heater can serve as a safety valve for an explosive gas or liquid on accidental temperature rise by adjusting the melting temperature of the low-melting metal by changing the composition of the low-melting metal.

The process for production of the valve of this Embodiment is basically the same as that of First Embodiment. In this Embodiment, in patterning of the chromium layer and the copper layer, the patterns of micro-resistor 501 and electrode pads 500 are formed simultaneously with the pattern for coating of low melting point metal member 102. Before the immersion of substrate 100 in the liquid bath for coating with low melting point metal member 102, micro-resistor 500 and electrode pads 501 are preferably coated preliminarily with a photoresist not to be coated by the low-melting metal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-305353, filed Nov. 10, 2006, which is hereby incorporated by reference herein in its entirety.

What is claimed is:

1. A valve comprising:
    a silicon substrate;
    a channel penetrating an entire thickness of the silicon substrate; and
    a low melting point metal member deposited on one face of the silicon substrate to obstruct the channel,
    wherein a metal layer is provided between the low melting point metal member and the silicon substrate, and
    wherein the metal layer is formed from copper.

2. The valve according to claim 1, wherein the low melting point metal member is formed from an alloy containing at least one element selected from a group that includes: Bi, Sn, Pb, In, and Cd.

3. The valve according to claim 1, wherein a part of the low melting point metal member is allowed to intrude into the channel.

4. The valve according to claim 1, wherein the metal layer formed from copper is covered by a photoresist layer, and a part of the low melting point metal member is allowed to intrude into the photoresist layer and is deposited on the metal layer formed from copper.

5. The valve according to claim 1, wherein a trench is formed on a portion of the silicon substrate onto which the low melting point metal member is deposited.

6. The valve according to claim 1, wherein a heater component is placed between the low melting point metal member and the silicon substrate.

7. A valve comprising:
    a silicon substrate;
    a channel penetrating an entire thickness of the silicon substrate; and
    a low melting point metal member deposited on one face of the silicon substrate to obstruct the channel,
    wherein a metal layer is provided between the low melting point metal member and the silicon substrate, and
    wherein an adhesion layer is provided between the metal layer and the silicon substrate.

8. The valve according to claim 7, wherein the adhesion layer is a chromium layer or a titanium layer.

9. The valve according to claim 7, wherein the low melting point metal member is formed from an alloy containing at least one element selected from a group that includes: Bi, Sn, Pb, In, and Cd.

10. The valve according to claim 7, wherein a part of the low melting point metal member is allowed to intrude into the channel.

11. The valve according to claim 7, wherein the metal layer is formed from copper and is covered by a photoresist layer, and a part of the low melting point metal member is allowed to intrude into the photoresist layer and is deposited on the metal layer formed from copper.

12. The valve according to claim 7, wherein a trench is formed on a portion of the silicon substrate onto which the low melting point metal member is deposited.

13. The valve according to claim 7, wherein a heater component is placed between the low melting point metal member and the silicon substrate.

14. A valve comprising:
    a silicon substrate;
    a channel penetrating an entire thickness of the silicon substrate; and
    a low melting point metal member deposited on one face of the silicon substrate to obstruct the channel,
    wherein a surface of the low melting point metal member and a surface of the silicon substrate onto which the low melting point metal member is deposited are covered at least partly by a photoresist layer.

15. The valve according to claim 14, wherein the low melting point metal member is formed from an alloy containing at least one element selected from a group that includes: Bi, Sn, Pb, In, and Cd.

16. The valve according to claim 14, wherein a part of the low melting point metal member is allowed to intrude into the channel.

17. The valve according to claim 14, wherein a trench is formed on a portion of the silicon substrate onto which the low melting point metal member is deposited.

18. The valve according to claim 14, wherein a heater component is placed between the low melting point metal member and the silicon substrate.

* * * * *